(12) United States Patent
Mishima et al.

(10) Patent No.: US 8,508,780 B2
(45) Date of Patent: Aug. 13, 2013

(54) SCANNER APPARATUS CAPABLE OF OPTIMAL TRANSMISSION AND SAVING OF IMAGE DATA

(75) Inventors: Kimie Mishima, Itami (JP); Yoshiki Tokimoto, Nishiwaki (JP); Yoshiyuki Tamai, Itami (JP); Masami Yamada, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 819 days.

(21) Appl. No.: 10/751,961

(22) Filed: Jan. 7, 2004

(65) Prior Publication Data

US 2005/0063003 A1    Mar. 24, 2005

(30) Foreign Application Priority Data

Sep. 18, 2003 (JP) ................................. 2003-325942

(51) Int. Cl.
*G06K 15/00* (2006.01)
(52) U.S. Cl.
USPC ........................ 358/1.16; 358/1.14; 358/1.15
(58) Field of Classification Search
USPC ............... 358/1.1, 1.15, 474, 505, 1.14, 1.16; 382/318; 709/201, 202, 203, 212, 216, 217, 709/219, 223, 224, 238, 239, 243, 244
See application file for complete search history.

(56) References Cited

U.S. PATENT DOCUMENTS

| | | | | |
|---|---|---|---|---|
| 5,105,285 A | * | 4/1992 | Miyata | 358/449 |
| 5,625,757 A | * | 4/1997 | Kageyama et al. | 358/1.14 |
| 5,659,669 A | * | 8/1997 | Narukawa et al. | 358/1.2 |
| 5,740,028 A | * | 4/1998 | Sugiyama et al. | 725/149 |
| 5,911,044 A | * | 6/1999 | Lo et al. | 709/203 |
| 6,057,940 A | * | 5/2000 | Kawamoto | 358/404 |
| 6,223,223 B1 | * | 4/2001 | Kumpf et al. | 709/227 |
| 6,401,150 B1 | * | 6/2002 | Reilly | 710/104 |
| 6,434,343 B1 | * | 8/2002 | Kobayashi et al. | 399/8 |
| 6,718,378 B1 | * | 4/2004 | Machida | 709/223 |
| 6,788,315 B1 | * | 9/2004 | Kekic et al. | 715/733 |
| 6,788,435 B2 | * | 9/2004 | Ouchi et al. | 358/474 |
| 6,836,340 B2 | * | 12/2004 | Yoshihara et al. | 358/1.15 |

(Continued)

FOREIGN PATENT DOCUMENTS

| | | |
|---|---|---|
| JP | 10-308840 | 11/1998 |
| JP | 11161586 A * | 6/1999 |
| JP | 2000-92121 | 3/2000 |
| JP | 2002-77177 | 3/2002 |

OTHER PUBLICATIONS

Machine Translation of JP 11-161586 A, "Buffer Device", Moriya Yoshishiro.*

(Continued)

*Primary Examiner* — Richard Zhu
(74) *Attorney, Agent, or Firm* — Buchanan Ingersoll & Rooney PC

(57) ABSTRACT

When a PC as a transmission destination and a shared folder as a saving destination are designated and start of scanning is instructed, a scanner apparatus scans an original, confirms state of activation of the PC and stores the scan data temporarily in a storage unit until the PC is activated. When the PC is activated and transmission becomes possible, the scan data that has been stored in the storage unit is transmitted to the PC and saved in the designated shared folder.

21 Claims, 7 Drawing Sheets

(56) References Cited

U.S. PATENT DOCUMENTS

| | | | |
|---|---|---|---|
| 6,862,114 B1 * | 3/2005 | Hayashi | 358/437 |
| 7,173,721 B1 * | 2/2007 | Kobayashi et al. | 358/1.15 |
| 7,180,619 B2 * | 2/2007 | Ferlitsch | 358/1.15 |
| 7,243,126 B2 * | 7/2007 | Sasaki et al. | 709/206 |
| 7,266,601 B2 * | 9/2007 | Maekawa et al. | 709/224 |
| 7,271,926 B2 * | 9/2007 | Amemiya | 358/1.15 |
| 7,711,179 B2 * | 5/2010 | Knighton et al. | 382/154 |
| 2001/0021037 A1 * | 9/2001 | Itoh | 358/1.15 |
| 2001/0021038 A1 * | 9/2001 | Yoshihara et al. | 358/1.15 |
| 2002/0107983 A1 * | 8/2002 | Iyoki | 709/245 |
| 2002/0118397 A1 * | 8/2002 | Maruyama | 358/405 |
| 2002/0196478 A1 * | 12/2002 | Struble | 358/474 |
| 2003/0128402 A1 * | 7/2003 | Tanimoto | 358/402 |
| 2004/0233475 A1 * | 11/2004 | Mikuni et al. | 358/1.15 |

OTHER PUBLICATIONS

Notice of Ground of Rejection issued in a corresponding Japanese application, Sep. 27, 2005.

* cited by examiner

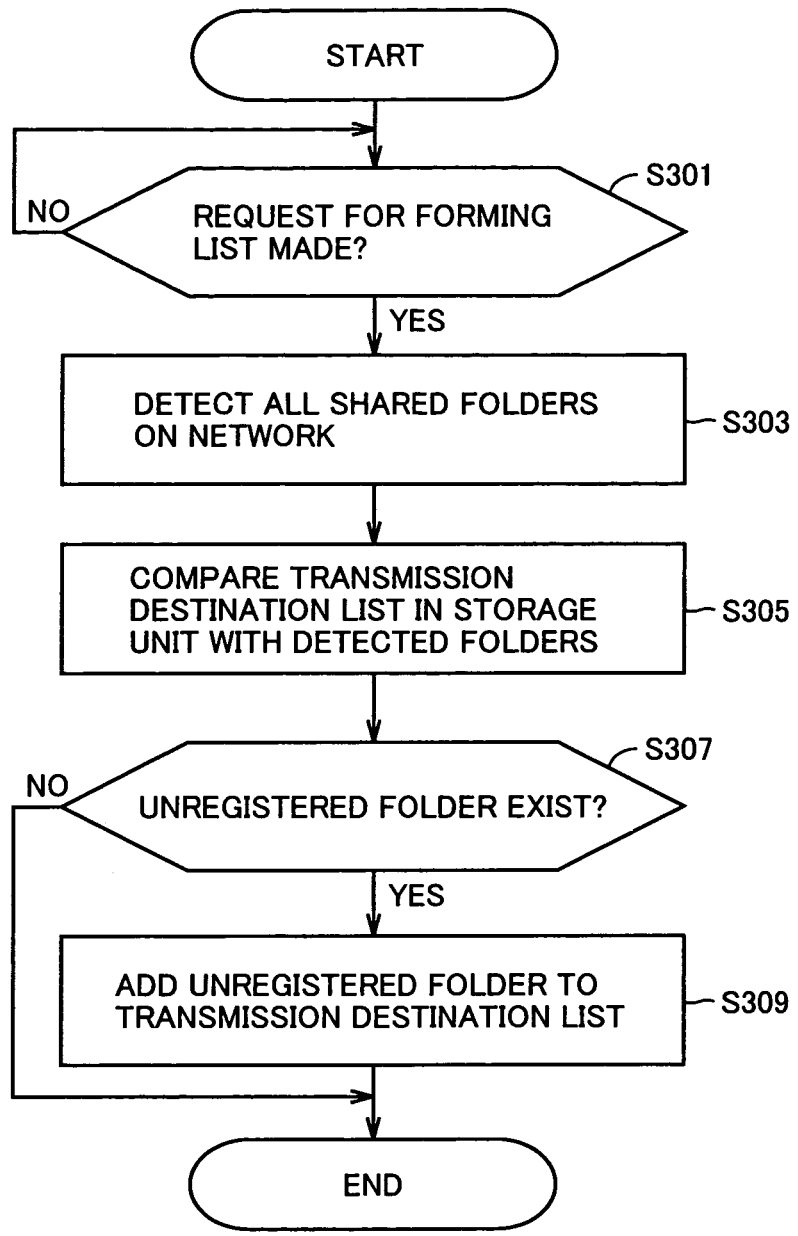

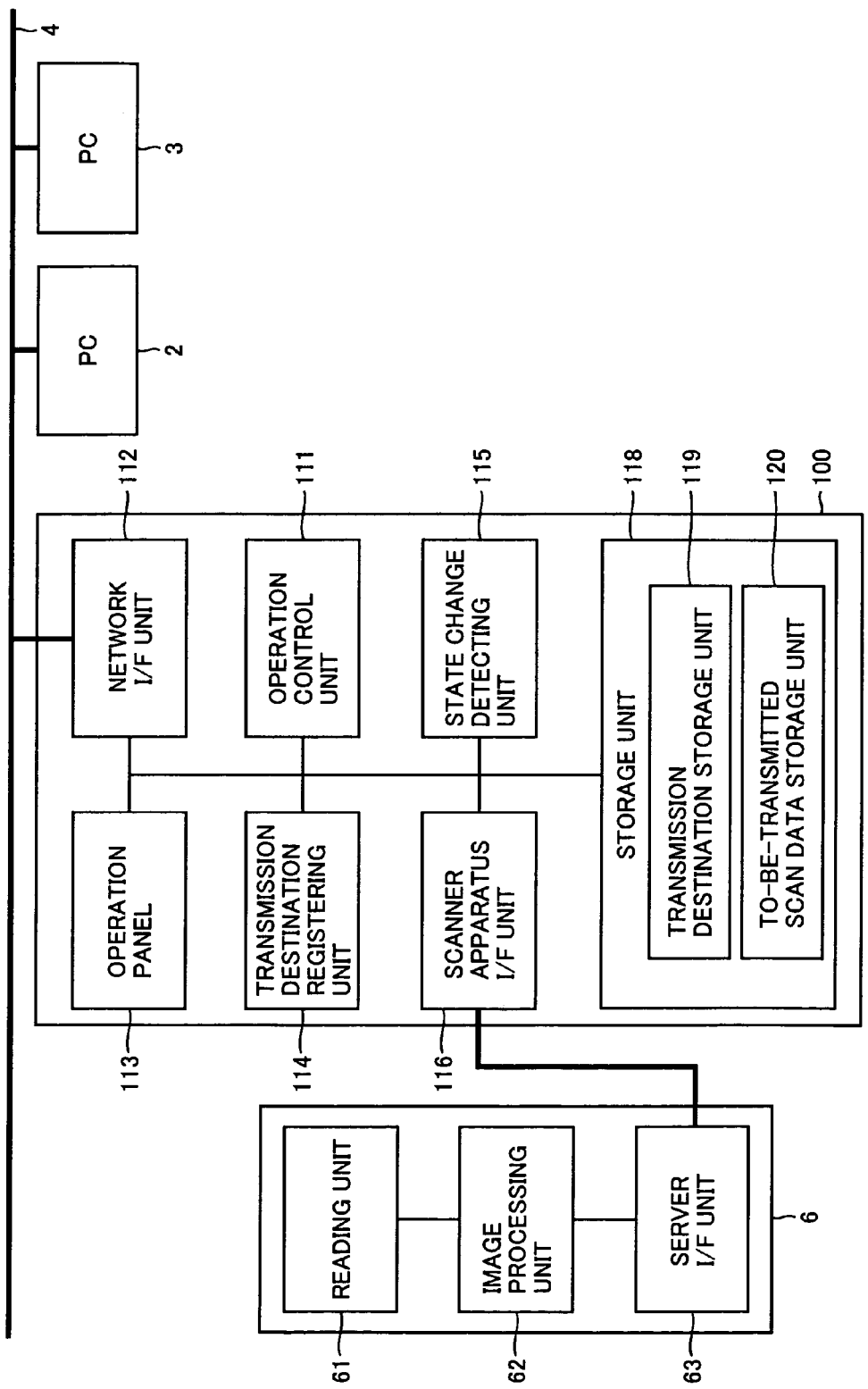

SCANNER APPARATUS CAPABLE OF OPTIMAL TRANSMISSION AND SAVING OF IMAGE DATA

This application is based on Japanese Patent Application No. 2003-325942 filed with Japan Patent Office on Sep. 18, 2003, the entire content of which is hereby incorporated by reference.

BACKGROUND OF THE INVENTION

1. Field of the Invention

The present invention relates to a scanner apparatus, a data transmission method, a data transmission program, a data processing apparatus and a data processing method. More specifically, the present invention relates to a scanner apparatus, a data transmission method, a data transmission program, a data processing apparatus and a data processing method that enable transmission and saving of image data to an intended destination while maintaining convenience for the user.

2. Description of the Related Art

Conventionally, a number of methods have been proposed for transmitting and saving scan data as image data obtained by scanning by a scanner to a computer on a network. Specific examples are as follows.

(1) A method in which a path to a shared folder of a destination computer is registered in advance, and by designating the registered path through an operation of an operation panel of the scanner apparatus, the scan data is transmitted to the designated computer and the data is saved in the shared folder without operating the computer.

(2) A method in which the scan data obtained by scanning by the scanner apparatus is transmitted attached to an e-mail, and a user manually saves the data in a designated folder in the computer as a recipient.

For more reliable transmission of the scan data, Japanese Laid-Open Patent Publication No. 2000-92121 discloses a network system in which an IP address of a connected computer is registered in a server to confirm the state of connection of the computer, and the scan data is transmitted from the server to the connected computer and saved therein.

Further, Japanese Laid-Open Patent Publication No. 2002-77177 discloses a method in which scan data is transmitted from a scanner apparatus to a computer that has a scan data receiving software stored therein, and the scan data is saved therein.

When the scan data is transmitted and saved in accordance with the method (1) or the method disclosed in Japanese Laid-Open Patent Publication No. 2002-77177, however, it is necessary to activate the computer as the destination before transmission. When the user who operates the scanner apparatus is at a location away from the destination computer and is not capable of confirming whether the computer is active or not, the scan data may not be transmitted even if a transmission operation is performed. In such a case, the user must go to see the state of the destination computer before transmission or when the transmission failed. This is not a very convenient approach.

When a folder in which the data is to be saved is not yet in a shared state, some scanner apparatuses do not display the folder as a possible destination on an operation panel, and therefore, the folder that is not yet in the shared state cannot be designated as the saving destination.

When the scan data is transmitted in accordance with the method (2), a user operation is necessary on the computer that received the scan data, and this approach is not very convenient, either.

In the network system disclosed in Japanese Laid-Open Patent Publication No. 2000-92121, whether communication with the computer connected to the network is possible or not is confirmed by recognizing the IP address thereof When the folder as a destination for saving the scan data is deleted in the computer of interest or when the folder is not shared, it is impossible to save the scan data in the corresponding folder, even if the IP address is recognized and the scan data is transmitted.

Further, the network system disclosed in Japanese Laid-Open Patent Publication No. 2000-92121 has a disadvantage that it is necessary for the computer to have a command for confirming connection to the network.

SUMMARY OF THE INVENTION

Therefore, an object of the present invention is to provide a scanner apparatus, a data transmission method, a data transmission program, a data processing apparatus and a data processing method that can surely transmit and save the scan data to an intended destination, even when a user of a scanner apparatus transmits the scan data without paying any attention to the state of the computer designated as the destination of the scan data.

The above object of the present invention is attained by a scanner including the following components. Specifically, the scanner includes: a reading unit reading an original and obtaining scan data; a transmission destination registering unit registering information related to one or more shared folders on a network; a designating unit designating a saving destination for saving the scan data among the registered shared folders; a state detecting unit detecting a state of an apparatus having the shared folder designated as the saving destination; a passing unit passing the scan data to a storage device to be stored therein, when it is detected by the state detecting unit that the apparatus is in a state in which communication is impossible; and a transmitting unit transmitting, when it is detected by the state detecting unit that the apparatus is in a state in which communication is possible, the scan data or the scan data stored in the storage device to the apparatus to be saved in the designated shared folder.

According to another aspect, the present invention provides a data transmission method including: transmission destination registering step of registering information related to one or more shared folders on a network; designating step of designating a saving destination for saving image data among the registered folders; state detecting step of detecting a state of an apparatus having the shared folder designated as the saving destination; passing step of passing, when it is detected in the state detecting step that the apparatus is in a state in which communication is impossible, the image data to a storage device to be stored therein; and transmission step of transmitting, when it is detected in the state detecting step that the apparatus is in a state in which communication is possible, the image data or the image data stored in the storage device to the apparatus to be saved in the designated shared folder.

According to a still another aspect, the present invention provides a data transmission program that makes a computer execute an image data transmitting process including: transmission destination registering step of registering information related to one or more shared folders on a network; designating step of designating a saving destination for saving image data among the registered folders; state detecting step of detecting a state of an apparatus having the shared folder designated as the saving destination; passing step of passing, when it is detected in the state detecting step that the apparatus is in a state in which communication is impossible, the image data to a storage device to be stored therein; and transmission step of transmitting, when it is detected in the state detecting step that the apparatus is in a state in which communication is possible, the image data or the image data stored in the storage device to the apparatus to be saved in the designated shared folder.

According to a still further aspect, the present invention provides a data processing apparatus including: an input unit receiving image data as an input; a designating unit designating a shared folder of a computer connected to allow communication, as a transmission destination of the input image data; a storage unit storing the image data; a passing unit passing the image data to the storage unit to be stored therein, when transmission of the image data to the designated shared folder is impossible; and a control unit controlling transmission such that when it is possible to transmit the image data to the designated shared folder, the image data or the image data stored in the storage unit is transmitted to the designated shared folder.

According to a still further aspect, the present invention provides a data processing method including: input step of inputting image data; designating step of designating, as a transmission destination of the input image data, a shared folder of a computer connected to allow communication; passing step of passing the image data to a storage device to be stored therein, when it is impossible to transmit the image data to the designated shared folder; and control step of controlling transmission such that when it is possible to transmit the image data to the designated shared folder, the image data or the image data stored in the storage device is transmitted to the designated shared folder.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flow chart representing a process for forming a transmission destination list executed by a scanner apparatus 1 in accordance with an embodiment.

FIG. 7 shows a specific example of a scanner system configuration in accordance with another embodiment.

DESCRIPTION OF THE PREFERRED EMBODIMENTS

Figure 1:
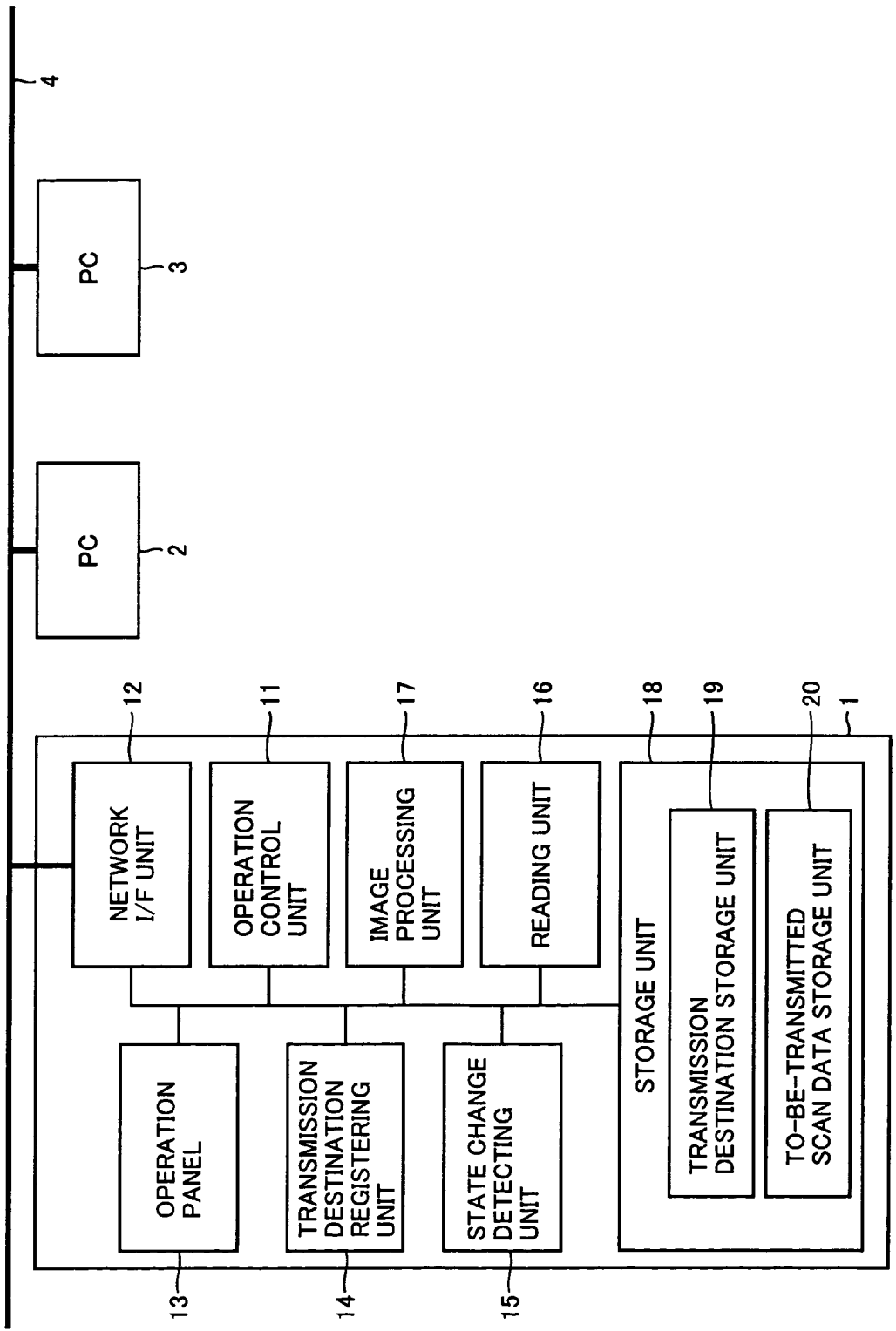
FIG. 1 shows a specific example of a scanner system configuration in accordance with an embodiment.

Embodiments of the present invention will be described in the following with reference to the figures. In the following description, the same or corresponding parts and components are denoted by the same reference characters. Names and functions of these components are also the same. Therefore, detailed description thereof will not be repeated.

Referring to FIG. 1, a scanner system in accordance with the present embodiment includes a scanner apparatus 1 and personal computers (hereinafter referred to as PCs) PC2 and PC3 that are connected through a network 4.

The network 4 may be a network of wired communication using a telephone line or a dedicated line such as a LAN (Local Area Network), or a network of wireless communication such as infrared communication.

Further referring to FIG. 1, scanner apparatus 1 includes an operation control unit 11 controlling the overall apparatus, a network I/F (interface) unit 12 for connection to the network 4, a reading unit 16 for reading an original as a paper document to scanner apparatus 1, image processing unit 17 generating scan data (image data) from the data read by reading unit 16, an operation panel 13 used, for example, to designate a transmission destination of the scan data, a storage unit 18 storing data and a program to be executed by operation control unit 11, a transmission destination registering unit 14 to have a new destination stored in storage unit 18, and a state change detecting unit 15 detecting a change in state of the PCs connected through network 4. Further, storage unit 18 includes a transmission destination storage unit 19 storing the destination and a to-be-transmitted scan data storage unit 20 storing scan data that are not yet transmitted.

In scanner apparatus 1, reading unit 16 reads an original set on a platen, and passes the read data to image processing unit 17. Image processing unit 17 executes image processing on the data passed from reading unit 16, and generates scan data.

Operation panel 13 displays possible transmission destinations stored in destination storage unit 19 to allow selection therefrom, and receives designation of a transmission destination by the user. The received destination is passed from operation panel 13 to state change detecting unit 15. State change detecting unit 15 detects a change in activation state of the PC as the destination received from operation panel 13, and passes the result of detection to image processing unit 17.

In accordance with the result of detection passed from state change detecting unit 15, image processing unit 17 has the generated scan data stored in to-be-transmitted scan data storage unit 20 or outputs the scan data to the designated destination through network I/F unit 12.

Figure 2:
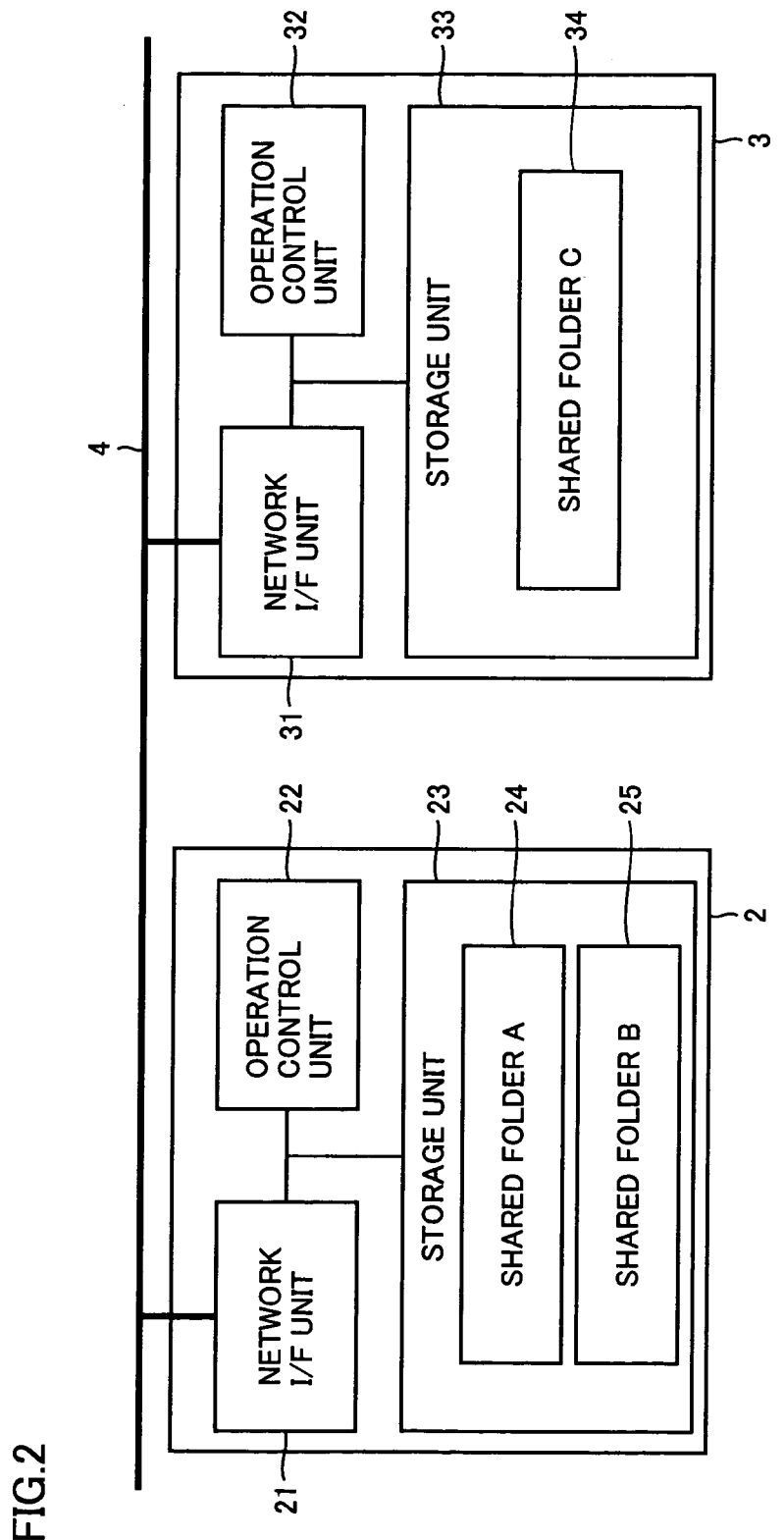
FIG. 2 shows specific exemplary configurations of PC2 and PC3.

Next, referring to FIG. 2, PC2 includes an operation control unit 22 controlling PC2 as a whole, a network I/F unit 21 for connection to network 4, and a storage unit 23 storing data and a program to be executed by operation control unit 22, and the storage unit 23 includes shared folders A24 and B25 storing data.

Similarly, PC3 also includes an operation control unit 32 controlling PC3 as a whole, a network I/F unit 31 for connection to network 4, and a storage unit 33 storing data and a program to be executed by operation control unit 32, and the storage unit 33 includes a shared folder C34 storing data.

Figure 3:
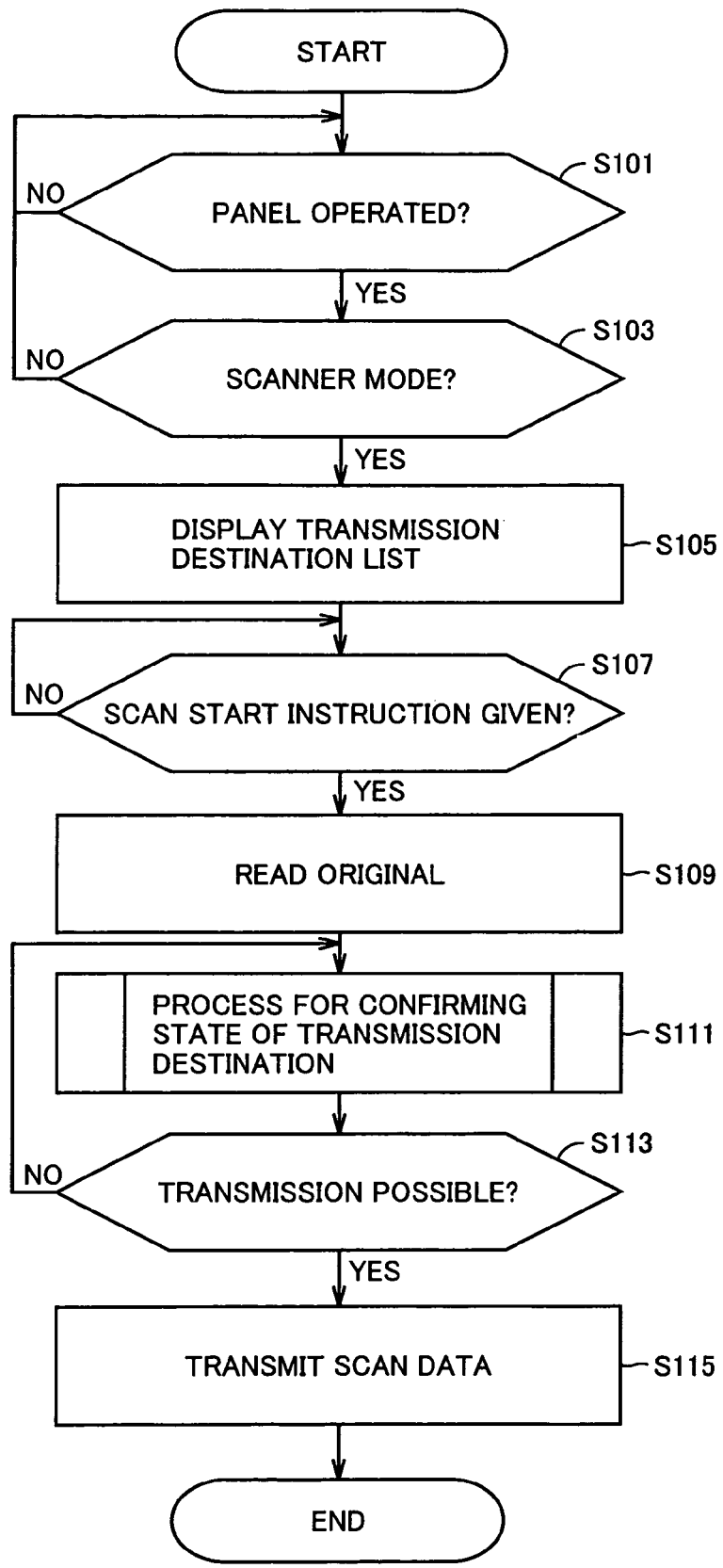
FIG. 3 is a flow chart representing a scan data transmission process by a scanner apparatus 1 in accordance with an embodiment.

Referring to FIG. 3, the processes for transmitting and saving scan data by scanner apparatus 1 in accordance with the present embodiment will be described. Transmission and saving processes of scan data shown in the flow chart of FIG. 3 are realized as operation control unit 11 of scanner apparatus 1 reads and executes the program stored in storage unit 18 to control operations of various units shown in FIG. 1.

In the present embodiment, a specific example will be described in which scan data obtained by scanning by scanner apparatus 1 is transmitted to PC2 to be stored in shared folder A24, where PC2 is not yet activated immediately after scanning by scanner apparatus 1 but activated after a prescribed time period.

Referring to FIG. 3, operation control unit 11 waits for a designating operation through operation panel 13 (S101). When operation panel 13 is operated for designation (YES in S101), whether the scanner apparatus 1 is in a scan possible mode or not is confirmed (YES in S103), shared folder information indicating a shared folder provided in a PC to which transmission is possible, stored in destination storage unit 19, is referred to, and destinations that are available for transmission at present are displayed on operation panel 13 to allow selection therefrom (S105).

Figure 4:
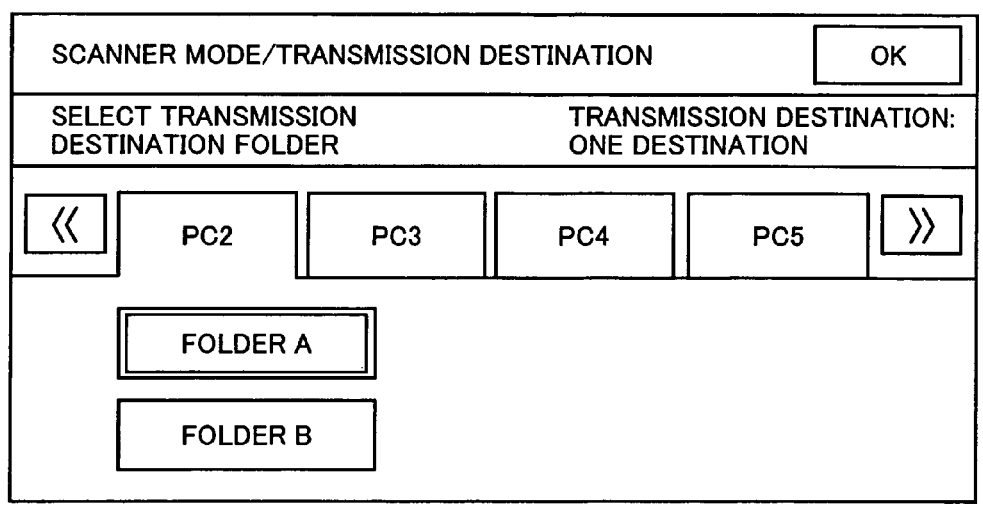
FIG. 4 shows a specific example of a display appearing on an operation panel 13 in step S105.

As shown in FIG. 4, PC2, PC3, PC4 (not shown in FIG. 1) and PC5 (not shown in FIG. 1) connected to network 4, to which scan data can be transmitted, are displayed on operation panel 13 to allow selection therefrom, and for each PC, shared folders included in the PC are displayed to allow selection therefrom. In the present embodiment, in order to transmit the scan data obtained by scanner apparatus 1 to PC2 and to store the same in shared folder A24, PC2 is selected as the destination of the scan data and shared folder A24 is designated as the shared folder for storing the scan data, through operation panel 13 shown in FIG. 4. In addition to the designation of transmission and storage destinations, method of reading the original, method of transmission and the like may be set through operation panel 13. By pressing an OK button, determination of transmission and storage destinations and start of scanning operation are input to scanner apparatus 1.

When transmission and storage destinations are designated and scan start is instructed through operation panel 13 (YES in S107), the original is read by reading unit 16 and the scan data is generated by image processing unit 17 (S109).

Further, in response to an operation designating transmission, information related to the PC designated as the destination is obtained at state change detecting unit 15 from the destination PC through network I/F unit 12, whereby activation of the PC is detected (S111). The process of confirming the state of the transmission destination in step S111 will be described later with reference to a subroutine. In the present embodiment, PC2 designated as the transmission destination is not yet activated immediately after execution of scanning, and therefore, activation of PC2 is not detected as a result of the process for confirming the state of transmission destination.

When activation of the PC designated as the transmission destination is not detected as a result of the process for confirming the state of transmission destination, that is, when the PC, is not active (NO in S113), the flow returns to step S111, and the process for confirming the state of transmission destination is repeated until the corresponding PC is activated and ready for transmission. When the corresponding PC becomes active and is ready for transmission, the scan data is transmitted through network I/F unit 12 to the PC (S115), and stored in the designated shared folder.

The scan data transmission and saving processes in scanner apparatus 1 in accordance with the present embodiment are performed as described above.

Next, the process for confirming state of transmission destination of step S111 above will be described with reference to FIG. 5.

Figure 5:
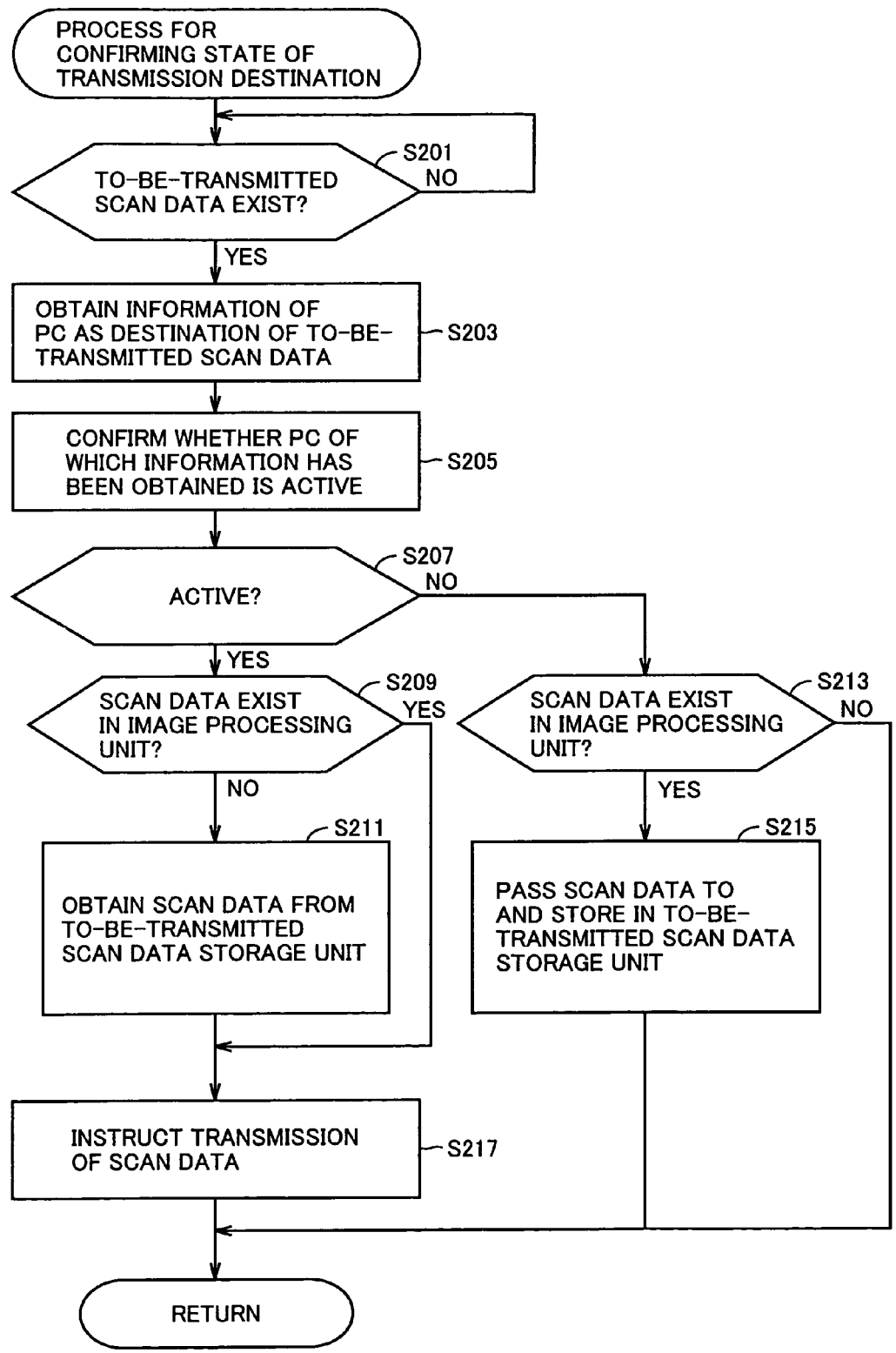
FIG. 5 is a flow chart representing a process for confirming state of transmission destination in step S111.

Referring to FIG. 5, when the original has been scanned in step S109 and the scan data obtained thereby is not yet transmitted but remaining in scanner apparatus 1 (YES in S201), state change detecting unit 15 obtains information about the PC designated as the transmission destination, through network I/F unit 12 (5203). As the information of the PC is obtained in step S203, state change detecting unit 15 confirms that the PC is active (S205). In the present embodiment, PC2 is designated as the transmission destination, and hence, when information about PC2 is obtained from PC2, activation thereof is confirmed.

When it is confirmed as a result of step S205 that the PC is active (YES in S207) and the not-yet transmitted scan data that is to be transmitted to the PC exists in image processing unit 17 (YES in S209), an instruction is given to image processing unit 17 to transmit the scan data (S217). At this time, in step S115 described above, the scan data is passed from image processing unit 17 to network I/F unit 12, and transmitted to the designated destination.

When the not-yet transmitted scan data that is to be transmitted to the PC exists not in image processing unit 17 (NO in S209), the scan data is obtained by operation control unit 11 from to-be-transmitted scan data storage unit 20 (S211), and an instruction is given to operation control unit 11 to transmit the scan data (S217). Here, in step S115 described above, the scan data obtained from to-be-transmitted scan data storage unit 20 is passed from operation control unit 11 to network I/F unit 12, and transmitted to the designated destination.

Then, the flow returns to the main routine shown in FIG. 3.

When the activation of the PC of interest is not detected by the confirmation in step S205, that is, when the PC is not active (NO in S207) and the not-yet transmitted scan data to be transmitted to the PC exists in image processing unit 17 (YES in S213), the scan data is stored in the to-be-transmitted scan data storage unit 20 (S215), and the flow returns to the main routine shown in FIG. 3. When the not-yet transmitted scan data to be transmitted to the PC exists not in image processing unit 17 (NO in S213), step S215 is skipped and the flow returns to the main routine shown in FIG. 3.

In the present embodiment, PC2 is not active immediately after scanning by scanner apparatus 1 and PC2 is activated after a certain time period, activation of PC2 is not detected immediately after scanning of the original by scanner apparatus 1 (NO in S207), and it is confirmed that the scan data exists in image processing unit 17 (YES in S213). In this situation, it is impossible to transmit the scan data to PC2, and therefore, in step S215, the scan data is passed from image processing unit 17 to to-be-transmitted scan data storage unit 20 and stored therein.

Before activation of PC2, it is determined in step S113 that transmission of the scan data to PC2 is impossible, and the process for confirming state of transmission destination of step S111 shown in FIG. 5 is repeatedly executed at an arbitrary timing, for example, at a constant interval. In the process of confirming state of transmission destination at that time, the process of step S215 is skipped.

When PC2 is activated after a prescribed time period, activation is detected in step S207. Here, the scan data has already been passed from image processing unit 17 to to-be-transmitted scan data storage unit 20 and stored therein, and therefore, the scan data is obtained from to-be-transmitted scan data storage unit 20 by operation control unit 11 in step S211 and an instruction is given to operation control unit 11 to transmit the scan data in step S217. Thus, in step S115, the scan data is transmitted to PC2, and stored in the designated shared folder A24.

In scanner apparatus 1 in accordance with the present embodiment, in order to designate the transmission destination of the scan data, it is necessary that the shared folder information is stored in advance in transmission destination storage unit 19. In the present embodiment, description will be given assuming that the shared folder information is stored in transmission destination storage unit 19 in the form of a list, that is, a transmission destination list. It is noted that the manner of storing the shared folder information is not limited to the list form, and any other form may be used.

Next, a process for forming the transmission destination list executed by scanner apparatus 1 in accordance with the present embodiment will be described with reference to FIG. 6. The process for forming transmission destination list shown in FIG. 6 is realized by operation control unit 11 of scanner apparatus 1 reading and executing a program stored in storage unit 18 to mainly control the operation of transmission destination registering unit 14.

Referring to FIG. 6, upon reception of a request for forming a list (YES in S301), transmission destination registering unit 14 detects all the shared folders of the PCs that are connected to network 4 and are active at present (S303). The request for forming the list may be input from operation control unit 11 to transmission destination registering unit 14, or it may be input from a different apparatus (by way of example, a management PC) through network 4 to transmission destination registering unit 14. Further, the request for forming the list may be made at an arbitrary timing. For instance, the request may be made periodically at a prescribed interval, or may be made in response to some trigger (for example, when scanner 1 is powered on), or it may be arbitrary made by an administrator. It is most preferable that the transmission destination list reflects the latest state of activation of the PCs on network 4, and hence, the request for forming the list should preferably be made at a short interval.

Thereafter, the shared folders detected in step S303 are compared with the transmission destination list stored in transmission destination storage unit 19 (S305), and whether there is any shared folder that is not yet registered in the destination list or not is determined (S307). When it is determined as a result that a shared folder not registered in the destination list, that is, not stored in transmission destination storage unit 19 is detected in step S303 (YES in S307), the not-yet-registered folder is added as a new destination to the transmission destination list, and stored in transmission destination storage unit 19 (S309).

The process for forming the transmission destination list in scanner apparatus 1 in accordance with the present embodiment is performed in the above described manner.

In the present embodiment, PC2 is not yet active immediately after scanning by scanning apparatus 1, and PC2 is activated after a prescribed time period. Therefore, before the activation of PC2, shared folders A24 and B25 of PC2 are not registered in the transmission destination list, and assuming that the scanner system has such a configuration as shown in FIGS. 1 and 2, only the shared folder C34 of PC3 is registered with the transmission destination list. When a request for forming the list is made after activation of PC2, shared folders A24 and B25 of PC2 as well as shared folder C34 of PC3 are detected in step S303 described above. As a result of comparison in step S305, it is confirmed that shared folders A24 and B25 of PC2 are not yet registered with the transmission destination list. Therefore, when a request for forming the list is made after activation of PC2, shared folders A24 and B25 of PC2 are newly registered with the transmission destination list and stored in transmission destination storage unit 19 by transmission destination registering unit 14 in step S309 described above.

As the scanner apparatus in accordance with the present embodiment has the above described configuration and the scan data transmitting and saving processes and the process for forming the transmission destination list described above are executed, it becomes possible in scanner apparatus 1 to designate a shared folder, which has been temporarily not in a shared state, as a destination for storing the scan data and to store the scan data in that shared folder. Thus, it becomes possible for the user to transmit the scan data to the PC having a shared folder without paying attention to the state of activation of the PC on the network, which is very convenient for the user.

In the present embodiment, it is assumed that the scan data transmission and saving processes are all performed in scanner apparatus 1. When the scanner system has such a configuration as shown in FIG. 7 that includes a server 100 connected to a scanner apparatus 6 and PC2 and PC3 connected to network 4 as another embodiment, the processes may be performed in server 100.

Specifically, in another embodiment, referring to FIG. 7, scanner apparatus 6 includes at least a reading unit 61 reading an original, an image processing unit 62 generating scan data from the read data, and a server I/F unit 63 for communication with server 100.

Server 100 includes an operation control unit 111, a network I/F unit 112, a scanner apparatus I/F unit 116 for communication with scanner apparatus 6, an operation panel 113 for designating transmission destination of scan data obtained from scanner apparatus 6 through scanner apparatus I/F unit 116, for example, a storage unit 118, a transmission destination registering unit 114 and a state change detecting unit 115. Further, storage unit 118 includes a transmission destination storage unit 119 and a to-be-transmitted scan data storage unit 120. Various units included in server 100 have functions similar to those of various units included in scanner apparatus 1.

In the scanner system having the configuration shown in FIG. 7 also, it is possible to transmit the scanner data obtained by scanner apparatus 6 to a designated PC and to save the same in a shared folder, by performing, in server 100, the scanner data transmission and saving processes and the process for forming the transmission destination list described above.

Further, in place of the scanner apparatus 1, the data processing apparatus in accordance with the present invention may be implemented by a facsimile apparatus.

Specifically, a facsimile apparatus includes, in addition to the configuration of scanner apparatus 1 shown in FIG. 1, means for communicating through a telephone line, and as the image data obtained by the communicating means is handled in the similar manner as the scan data obtained by reading unit 16 of scanner apparatus 1, it is possible to transmit the image data to a desired PC and to save the same in a shared folder. The processes therefor are the same as those in scanner apparatus 1.

The method of transmitting the scan data image data) executed by a data processing apparatus such as scanner apparatus 1, server 100 or the facsimile apparatus described above, and the method of forming the transmission destination list may be provided as a program. Such a program may be provided as a program product, recorded on a computer readable recording medium such as a flexible disk, CD-ROM, ROM, RAM or a memory card to be used with a computer, or a hard disk provided within the computer. Alternatively, the program may be provided through a network, by downloading. The program thus provided is installed in the hard disk, read to the RAM and executed. It is noted that the program product encompasses the program itself and the recording medium on which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A scanner, comprising:
a storage device;
an image processing unit for receiving scan data obtained from a reading unit;
a transmission destination registering unit registering information related to one or more shared folders on a network;
a designating unit designating a saving destination for saving said scan data among said one or more shared folders registered by the transmission destination registering unit;
a state detecting unit detecting, before transmission of the scan data through the network, whether an external apparatus having the shared folder designated as said saving destination is in a state in which communication is possible or in a state in which communication is impossible;
a passing unit automatically passing, before transmission of the scan data through the network, said scan data from the image processing unit to the storage device without intervening processing when communication with said external apparatus is impossible, and passing said scan data to said external apparatus without storing said scan data in the storage device, when communication with said external apparatus is possible; and
a transmitting unit transmitting through the network said scan data when it is detected by said state detecting unit that said external apparatus having the shared folder is in a state in which communication is possible, and said transmitting unit transmitting through the network said scan data stored in said storage device when said external apparatus having the shared folder which was in a state in which communication was impossible, is detected by said state detecting unit as being in a state in which communication is possible.

2. The scanner according to claim 1, further comprising:
a shared folder detecting unit detecting a shared folder on the network at an arbitrary timing,
wherein said transmission destination registering unit additionally registers the shared folder newly detected by said shared folder detecting unit, based on said shared folder detected by said shared folder detecting unit and on information related to the one or more shared folders already registered in said transmission destination registering unit.

3. The scanner according to claim 1, wherein said state of said external apparatus is whether said external apparatus is active or not, and said state detecting unit detects whether said external apparatus is active or not at an arbitrary timing, after said scan data is passed to and stored in said storage device by said passing unit.

4. The scanner according to claim 1, wherein said image processing unit, said reading unit, said transmission destination registering unit, said designating unit, said state detecting unit, said passing unit, said storage device, and said transmitting unit are all incorporated in a single physical scanner.

5. The scanner according to claim 1, wherein the transmitting unit transmits through the network said scan data from the image processing unit when it is detected by said state detecting unit that said external apparatus having the shared folder is in a state in which communication is possible, and transmits through the network said scan data stored in said storage device when said external apparatus having the shared folder which was in a state in which communication was impossible, is detected by said state detecting unit as being in a state in which communication is possible.

6. A scanner, comprising:
a storage device;
an image processing unit for receiving scan data obtained from a reading unit;
a transmission destination registering unit registering information related to one or more shared folders on a network;
a designating unit designating a saving destination for saving said scan data among said one or more shared folders registered by the transmission destination registering unit;
a state detecting unit detecting, before transmission of the scan data through the network, whether an external apparatus having the shared folder designated as said saving destination is in a state in which communication is possible or in a state in which communication is impossible;
a passing unit automatically passing, before transmission of the scan data through the network, said scan data from the image processing unit to the storage device without intervening processing when communication with said external apparatus is impossible, and not storing said scan data in the storage device when it is detected by said state detecting unit that said external apparatus having the shared folder is in a state in which communication is possible; and
a transmitting unit transmitting through the network said scan data when it is detected by said state detecting unit that said external apparatus having the shared folder is in a state in which communication is possible, and said transmitting unit transmitting through the network said scan data stored in said storage device when said external apparatus having the shared folder which was in a state in which communication was impossible, is detected by said state detecting unit as being in a state in which communication is possible.

7. The scanner according to claim 6, further comprising:
a shared folder detecting unit detecting a shared folder on the network at an arbitrary timing,
wherein said transmission destination registering unit additionally registers the shared folder newly detected by said shared folder detecting unit, based on said shared folder detected by said shared folder detecting unit and on information related to the one or more shared folders already registered in said transmission destination registering unit.

8. The scanner according to claim 6, wherein said state of said external apparatus is whether said external apparatus is active or not, and said state detecting unit detects whether said external apparatus is active or not at an arbitrary timing, after said scan data is passed to and stored in said storage device by said passing unit.

9. The scanner according to claim 6, wherein said image processing unit, said reading unit, said transmission destination registering unit, said designating unit, said state detecting unit, said passing unit, said storage device, and said transmitting unit are all incorporated in a single physical scanner.

10. The scanner according to claim 6, wherein the transmitting unit transmits through the network said scan data from the image processing unit when it is detected by said state detecting unit that said external apparatus having the shared folder is in a state in which communication is possible, and transmits through the network said scan data stored in said storage device when said external apparatus having the shared folder which was in a state in which communication was impossible, is detected by said state detecting unit as being in a state in which communication is possible.

11. A scanner, comprising:
   a storage device;
   an image processing unit for receiving scan data obtained from a reading unit;
   a transmission destination registering unit registering destination information related to one or more external devices in a network, and one or more shared folders of the one or more external devices;
   a transmission destination storage unit storing the registered destination information;
   a designating unit designating, from the registered destination information stored in the transmission destination storage unit, one of the one or more shared folders of the one or more external devices, registered by the transmission destination registering unit, as a saving destination for saving said scan data;
   a state detecting unit detecting whether said one or more external devices is in a state in which communication is possible or in a state in which communication is impossible;
   a passing unit automatically passing, before transmission of the scan data through the network, said scan data from the image processing unit to the storage device without intervening processing when communication with said one or more external devices is impossible, and not storing said scan data in the storage device when it is detected that said one or more external devices is in a state in which communication is possible;
   a transmitting unit transmitting said scan data to the saving destination after detecting whether communication with said one or more external devices is possible or impossible; and
   a control unit that controls the transmitting unit to transmit said scan data to the saving destination, wherein the control unit performs an operation to transmit the scan data to the saving destination, and repeats said operation if the previous operation did not result in the scan data being received at the saving destination.

12. The scanner of claim 11, further comprising:
   a shared folder detecting unit detecting a shared folder on the network at an arbitrary timing;
   wherein said transmission destination registering unit additionally registers the shared folder newly detected by said shared folder detecting unit.

13. The scanner according to claim 11, wherein said image processing unit, said reading unit, said transmission destination registering unit, said designating unit, and said transmitting unit are incorporated in a single physical scanner.

14. The scanner according to claim 11, wherein the operation is repeated at a constant interval.

15. The scanner according to claim 11, wherein the control unit repeats said operation if the previous operation did not result in the scan data being received at the saving destination because communication with the external device was impossible.

16. A method of data transmission, comprising:
   receiving at an image processing unit scan data obtained from a reading unit;
   transmission destination registering step of registering information related to one or more shared folders on a network;
   designating step of designating a saving destination for saving said scan data among said registered folders registered in the transmission destination registering step;
   state detecting step of detecting, before transmission of the scan data through the network, whether an external apparatus having the shared folder designated as said saving destination is in a state in which communication is possible or in a state in which communication is impossible;
   passing step of automatically passing, before transmission of the scan data through the network, said scan data from the image processing unit to a storage device without intervening processing when communication with said external apparatus is impossible, and passing said scan data to said external apparatus without storing said scan data in the storage device, when communication with said external apparatus is possible; and
   transmission step of transmitting through the network said scan data when it is detected in said state detecting step that said external apparatus having the shared folder is in a state in which communication is possible, and said transmitting step transmitting through the network said scan data stored in said storage device when said external apparatus having the shared folder which was in a state in which communication was impossible, is detected in said state detecting step as being in a state in which communication is possible.

17. The method of data transmission according to claim 16, further comprising:
   shared folder detecting step of detecting a shared folder on the network at an arbitrary timing;
   wherein in said transmission destination registering step, the shared folder newly detected in said shared folder detecting step is additionally registered, based on said shared folder detected in said shared folder detecting step and on information related to the shared folders already registered in said transmission destination registering step.

18. The method of data transmission according to claim 16, wherein said state of said apparatus is whether said apparatus is active or not, and
   whether said apparatus is active or not is detected at an arbitrary timing in said state detecting step after said image data is passed to and stored in said storage device in said passing step.

19. A non-transitory computer-readable storage medium having a data transmission program stored thereon to make a computer execute an image data transmitting process comprising the steps of:
   receiving at an image processing unit scan data obtained from a reading unit;
   transmission destination registering step of registering information related to one or more shared folders on a network;
   designating step of designating a saving destination for saving said scan data among said registered folders registered in the transmission destination registering step;
   state detecting step of detecting, before transmission of the scan data through the network, whether an external apparatus having the shared folder designated as said saving destination is in a state in which communication is possible or in a state in which communication is impossible;
   passing step of automatically passing, before transmission of the scan data through the network, said scan data from the image processing unit to a storage device without intervening processing when communication with said external apparatus is impossible, and passing said scan data to said external apparatus without storing said scan data in the storage device, when communication with said external apparatus is possible; and
   transmission step of transmitting through the network said scan data when it is detected in said state detecting step that said external apparatus having the shared folder is in a state in which communication is possible, and said transmitting step transmitting through the network said scan data stored in said storage device when said external apparatus having the shared folder which was in a state in which communication was impossible, is detected in said state detecting step as being in a state in which communication is possible.

20. The non-transitory computer-readable storage medium according to claim 19, wherein the image data transmitting process further comprises:
a shared folder detecting step of detecting a shared folder on the network at an arbitrary timing;
wherein in said transmission destination registering step, the shared folder newly detected in said shared folder detecting step is additionally registered, based on said shared folder detected in said shared folder detecting step and on information related to the shared folders already registered in said transmission destination registering step.

21. The non-transitory computer-readable storage medium according to claim 19, wherein said state of said apparatus is whether said apparatus is active or not, and
whether said apparatus is active or not is detected at an arbitrary timing in said state detecting step after said image data is passed to and stored in said storage device in said passing step.

* * * * *